United States Patent
Bastani et al.

(10) Patent No.: US 10,572,764 B1
(45) Date of Patent: Feb. 25, 2020

(54) ADAPTIVE STEREO RENDERING TO REDUCE MOTION SICKNESS

(71) Applicant: GOOGLE LLC, Mountain View, CA (US)

(72) Inventors: Behnam Bastani, San Jose, CA (US); Damien Saint-Macary, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/997,884

(22) Filed: Jun. 5, 2018

Related U.S. Application Data

(60) Provisional application No. 62/515,111, filed on Jun. 5, 2017.

(51) Int. Cl.
| | |
|---|---|
| *G06T 15/00* | (2011.01) |
| *G06K 9/46* | (2006.01) |
| *G06F 3/01* | (2006.01) |
| *G02B 27/22* | (2018.01) |
| *G02B 27/01* | (2006.01) |

(52) U.S. Cl.
CPC ......... *G06K 9/4671* (2013.01); *G02B 27/017* (2013.01); *G02B 27/2228* (2013.01); *G06F 3/013* (2013.01); *G06T 15/005* (2013.01)

(58) Field of Classification Search
CPC .............. G06F 3/013; G06B 2017/014; G06B 27/0093; G06B 27/017; G06B 2027/0138; G06B 2017/0178; G06B 27/0172; G06B 2017/0147; A61B 3/113

USPC .......................................................... 345/418
See application file for complete search history.

(56) References Cited

U.S. PATENT DOCUMENTS

| | | | | |
|---|---|---|---|---|
| 8,487,959 | B1 * | 7/2013 | Khan ...................... | G06F 3/013 345/619 |
| 8,933,938 | B2 * | 1/2015 | Khan ...................... | G06F 3/013 345/440 |
| 9,857,871 | B2 * | 1/2018 | Mallinson ............... | G06F 3/013 |
| 9,977,960 | B2 * | 5/2018 | Gustafsson ........ | G06K 9/00604 |
| 10,042,421 | B2 * | 8/2018 | Mitchell ................. | G06F 3/013 |
| 10,043,281 | B2 * | 8/2018 | Mallinson ................ | G06T 7/20 |
| 10,110,935 | B2 * | 10/2018 | Elliott .............. | H04N 21/23434 |
| 10,192,528 | B2 * | 1/2019 | Young ................... | G09G 5/391 |
| 10,255,714 | B2 * | 4/2019 | Mitchell ................. | G06T 15/20 |

OTHER PUBLICATIONS

Issen, Laurel A., and David C. Knill. "Decoupling eye and hand movement control: Visual short-term memory influences reach planning more than saccade planning." Journal of vision 12, No. 1 (2012): 3-3.*

(Continued)

*Primary Examiner* — Phu K Nguyen
(74) *Attorney, Agent, or Firm* — Brake Hughes Bellermann LLP

(57) ABSTRACT

Techniques of displaying video in an HMD include performing an adaptive rendering operation to produce a transition between stereo and non-stereo rendering of objects in a virtual environment during eye saccade. Because viewers generally have low visual perception performance during eye saccade, the viewer will not notice this transition as much and will not experience as much motion sickness.

21 Claims, 15 Drawing Sheets

(56) References Cited

OTHER PUBLICATIONS

Vidhyasankar, Krishnamoorthy, Michael Weick, and Gollisch Tim. "Sensitivity to image recurrence across eye-movement-like image transitions through local serial inhibition in the retina." eLife 6 (Feb. 2017).*
Arabadzhiyska E, Tursun OT, Myszkowski K, Seidel HP, Didyk P. Saccade landing position prediction for gaze-contingent rendering. ACM Transactions on Graphics (TOG). Jul. 20, 2017;36(4):50.*
Blascheck T, Kurzhals K, Raschke M, Burch M, Weiskopf D, Ertl T. State-of-the-Art of Visualization for Eye Tracking Data. InEuroVis (STARs) Jun. 2014.*

* cited by examiner

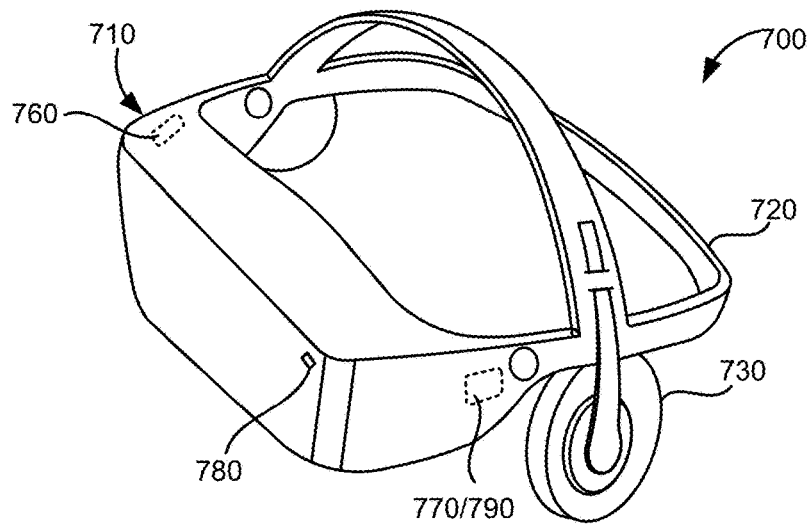
FIG. 7A
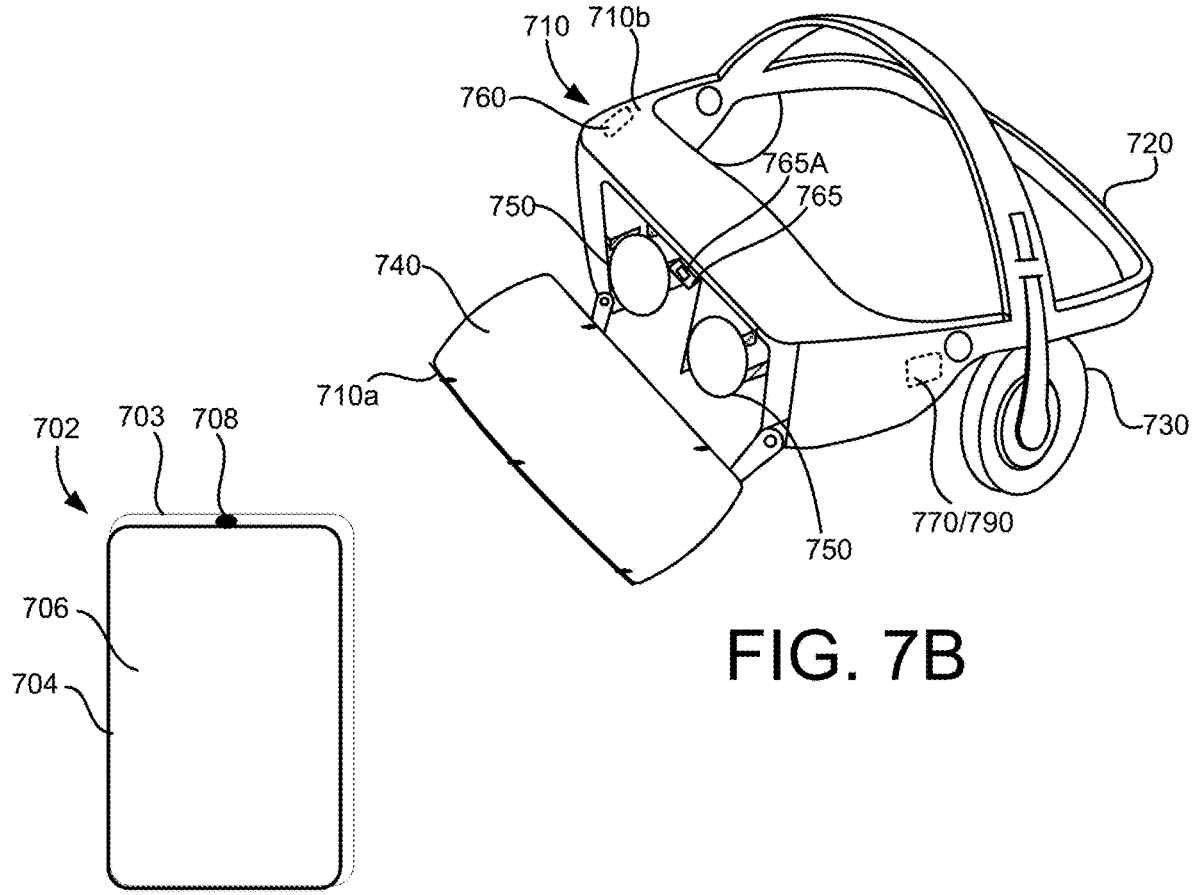
FIG. 7B
FIG. 7C

ADAPTIVE STEREO RENDERING TO REDUCE MOTION SICKNESS

CROSS-REFERENCE TO RELATED APPLICATIONS

This application claims priority to U.S. Patent Application No. 62/515,111, filed on Jun. 5, 2017, entitled "ADAPTIVE STEREO RENDERING TO REDUCE MOTION SICKNESS" and U.S. Patent Application No. 62/515,120, filed on Jun. 5, 2017, entitled "FOVEATED VIDEO TRANSMISSION", the disclosures of which are incorporated by reference herein in their entirety.

TECHNICAL FIELD

This description relates to improving the user experience concerning displays for virtual reality (VR) systems.

BACKGROUND

Virtual Reality (VR) and augmented reality (AR) use head-mounted displays (HMDs) to provide the illusion of immersion for a human viewer in a virtual environment. In such an illusion, a viewer may look at an object in the virtual environment. In a conventional HMD, such an object is rendered in stereo so that the viewer's eyes may focus at some vergence (i.e., a focal plane) while looking at the object.

SUMMARY

In one general aspect, a method can include receiving, by controlling circuitry of a processor configured to display video content to a viewer over a plurality of pixels of a display, eye saccade indication data indicating that the viewer is undergoing an eye saccade. The method can also include, in response to receiving the eye saccade indication data, performing, by the controlling circuitry, an adaptive rendering operation during the eye saccade to produce a transition between a stereo rendering and a non-stereo rendering of an object for a first portion of the plurality of pixels and a maintenance of the stereo rendering of the object for a second portion of the plurality of pixels.

The details of one or more implementations are set forth in the accompanying drawings and the description below. Other features will be apparent from the description and drawings, and from the claims.

BRIEF DESCRIPTION OF THE DRAWINGS

FIGS. 7A, 7B, and 7C are diagrams depicting the example VR HMD and controller.

DETAILED DESCRIPTION

A viewer using a conventional HMD may suffer from motion sickness and general discomfort during a stereo rendering of an object in a virtual environment. For example, the conventional HMD does not account for accommodation conflict in stereo viewing, meaning that the viewer may look at something close up, but the viewer's eye remains focused at a vergence further away from or closer to the viewer. There are some reasons for this accommodation conflict. In one example, there may be photon latency resulting from a finite processing time to render in stereo the objects in the virtual environment. Such a finite processing time may also be responsible for a mismatch between visual and proprioceptive cues (e.g., fast motion of hand should result in viewer seeing hand move fast in the virtual environment).

In accordance with the implementations described herein, improved techniques of displaying video in an HMD include performing an adaptive rendering operation to produce a transition between stereo and non-stereo rendering of objects in a virtual environment during eye saccade. Because viewers generally have low visual perception performance during eye saccade, the viewer will not notice this transition as much and will not experience as much motion sickness.

Figure 1:
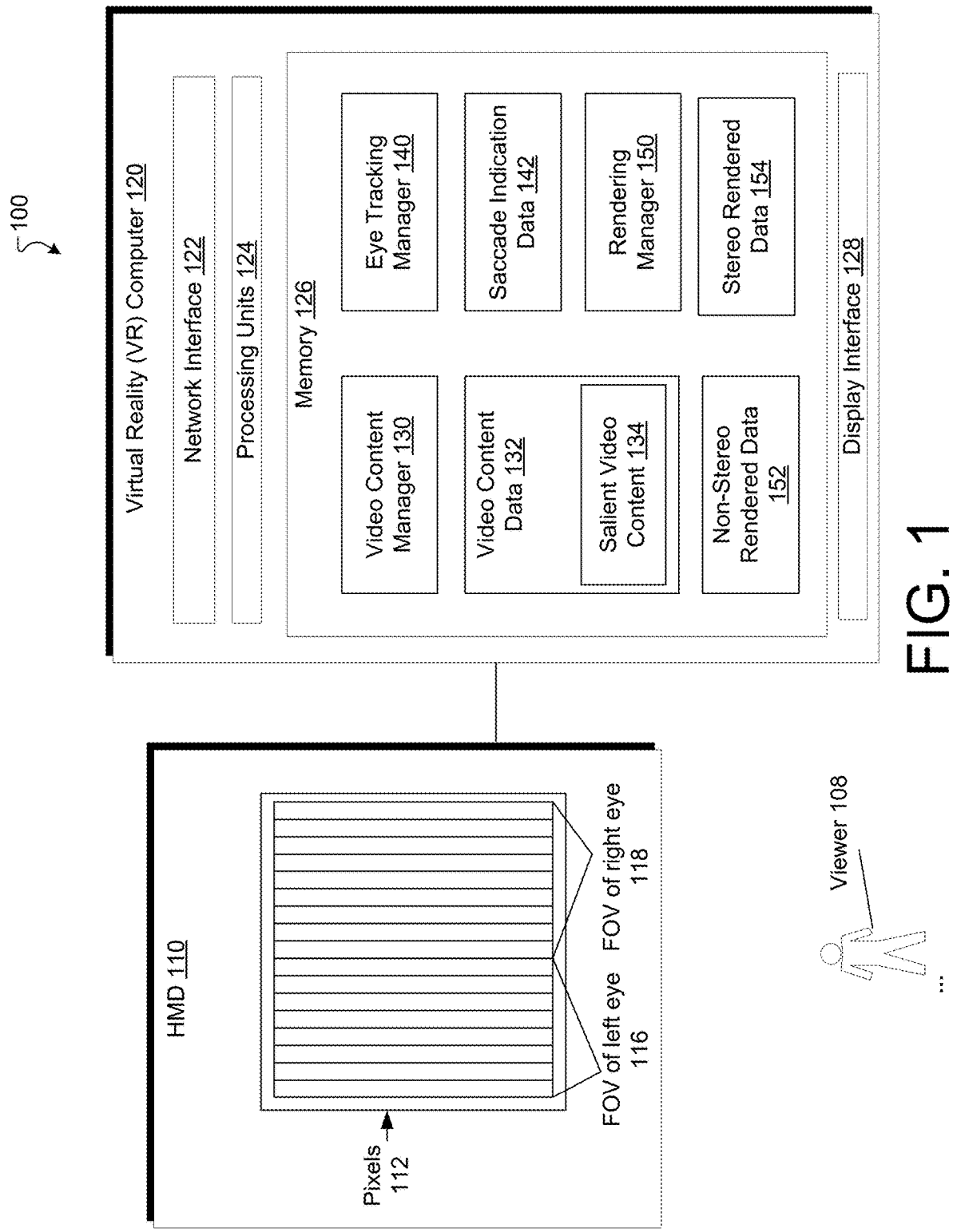
FIG. 1 is a diagram that illustrates an example electronic environment in which improved techniques described herein may be implemented.

FIG. 1 is a diagram that illustrates an example electronic environment 100 in which the above-described improved HMDs may be implemented. As shown, in FIG. 1, the electronic environment 100 includes a HMD 110 and a VR computer 120. As shown in FIG. 1, the HMD 110 is separate from the VR computer 120. In some implementations, such as the VR computer being a smartphone with an LCD screen, the HMD 110 is included within the VR computer 120.

The HMD 110 is configured to display high-resolution video frames to a human viewer 108 to provide an immersive VR experience. In some implementations, the HMD includes a pair of goggles that holds a smartphone with a screen (e.g., a LCD screen). In some implementations, the HMD 110 includes standalone goggles connected to (e.g., via a cable or a network connection) the VR computer 120. The HMD 110 includes an array of pixels 112, e.g., LCD pixels. In some arrangements, the goggles include respective lenses for each of the left and right eyes of the viewer 108 to render a stereo image of an object for the viewer 108. In some arrangements, the goggles may allow for non-stereo rendering of the object.

The VR computer 120 is configured to provide a video signal to the array of pixels 112. The VR computer 120 includes a network interface 122, one or more processing units 124, and memory 126.

In some embodiments, one or more of the components of the VR computer 120 can be, or can include processors (e.g., processing units 124) configured to process instructions stored in the memory 126. Examples of such instructions as depicted in FIG. 1 include a video content manager 130, an eye tracking manager 140, and a rendering manager 150. Further, as illustrated in FIG. 1, the memory 126 is configured to store various data, which is described with respect to the respective managers that use such data.

The video content manager 130 is configured to obtain video content data 132. In some implementations, the video frame manager 130 obtains the video content data 132 from a local source (e.g., a local disk drive, a flash drive, and the like). In some implementations, the video content manager obtains the video content data 132 from another computer connected to the VR computer 120 over a network. In some implementations, the video content manager 130 obtains the video content data 132 directly from a video camera.

The video content data 132 includes arrays of pixel values that represent video frames. For example, a high-definition video frame has 1920 rows and 1080 columns of pixels. Each video frame is shown to a viewer at a time determined by the refresh rate of the HMD 110 (e.g., 60 Hz). In some implementations, the number of pixels in such a video frame has the same number of pixels in the array 112.

In some implementations, the video content manager 130 is configured to identify salient video content 134 of the video content data 132. In some implementations, the salient video content 134 is that portion of the video content data 132 representing a region of a video frame that includes an object at which the viewer 108 is looking.

The eye tracking manager 140 is configured to perform an eye saccade indication operation to produce saccade indication data 142 indicating that the user 108 is currently experiencing eye saccade. In some implementations, the eye tracking manager 140 is configured to track the direction in which the user 108 is looking. In this way, the eye tracking manager 140 may then determine when eye saccade (i.e., the quick, simultaneous movement of both eyes of viewer 108 in the same direction) is occurring.

In some implementations, the saccade indication data 142 includes a flag that is received by the rendering manager 150, the flag indicating that eye saccade is taking place. In some implementations, the saccade indication data 142 also includes data indicating for which eye (i.e., over which FOV, 116 or 118) a non-stereo rendering of an image represented by the video content data 132 is to take place. In some implementations, the eye indicated is a non-dominant eye of the user 108.

The rendering manager 150 is configured to perform an adaptive rendering operation on the video content data 132. The adaptive rendering operation is performed in response to receiving the saccade indication data 142 indicating that the viewer 108 is undergoing eye saccade. The adaptive rendering operation includes rendering images for display on the HMD 110 to produce non-stereo rendered data 152 and stereo rendered data 154. The adaptive rendering operation performed by the rendering manager 150 may result in stereo or non-stereo rendering according to the eye indicated by the saccade indication data 142. In some implementations, the adaptive rendering operation includes transitioning an image rendering from stereo to non-stereo for the non-dominant eye of the viewer 108 (e.g., over the FOV 116) as indicated by the saccade indication data 142. In some implementations, after this transition, the rendering manager 150 is also configured to transition the image rendering from non-stereo back to stereo. Such transitions may help the viewer 108 avoid the perception of flickering, which can also interfere with the viewer's experience. In some implementations, the adaptive rendering operation further includes maintaining a stereo rendering of the image for the dominant eye (e.g., over the FOV 118) during the eye saccade indicated by the eye saccade data 142. That is, the stereo rendering of the image in this case continues for the dominant eye while the transition to non-stereo rendering takes place for the non-dominant eye.

In some implementations, the rendering manager 150 is configured to, as part of the adaptive rendering operation, perform the transition between a stereo rendering and non-stereo rendering of an image over a first set of pixels of the FOV 116 at a first time and over a second set of pixels of the FOV 116 at a second time after the first time. Details of such a rendering are discussed with respect to FIG. 3.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the VR computer 120 can be configured to operate within a cluster of devices (e.g., a server farm). In such an implementation, the functionality and processing of the components of the VR computer 120 can be distributed to several devices of the cluster of devices.

The components of the VR computer 120 can be, or can include, any type of hardware and/or software configured to process attributes. In some implementations, one or more portions of the components shown in the components of the VR computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the VR computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the VR computer 120 (or portions thereof) can be configured to operate within a network. Thus, the components of the VR computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The network interface 122 includes, for example, Ethernet adaptors, Token Ring adaptors, and the like, for converting electronic and/or optical signals to electronic form for use by the VR computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the VR computer 120 can be, or can include, processors configured to process instructions stored in a memory. For example, a video content manager 130 (and/or a portion thereof), an eye tracking manager 140 (and/or a portion thereof), and a rendering manager 150 can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the VR computer 120. As illustrated in FIG. 1, the memory 126 is configured to store various data, including video content data 132, saccade indication data 142, and non-stereo and stereo rendered data 152 and 154.

Figure 2:
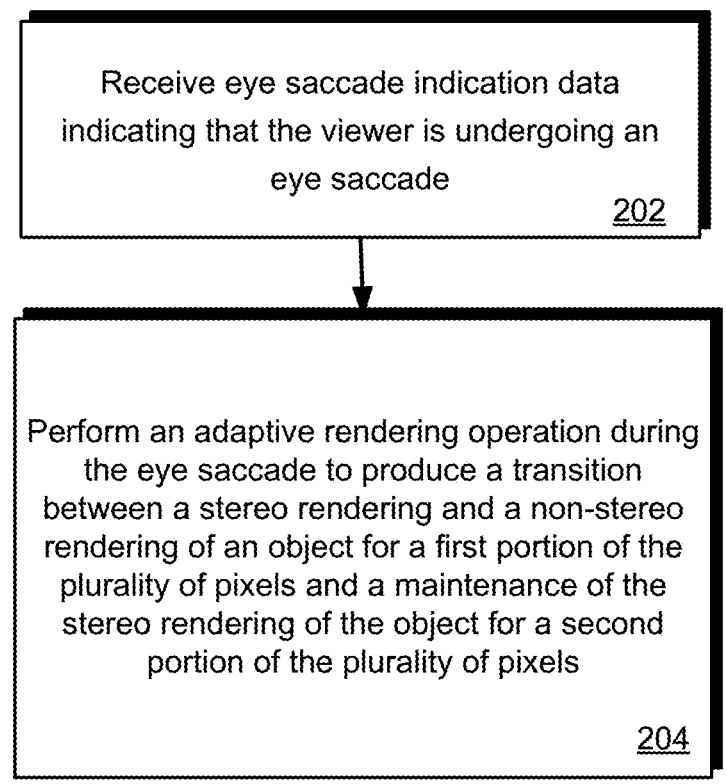
FIG. 2 is a flow chart that illustrates an example method of implementing the improved techniques as shown in FIG. 1.

FIG. 2 is a flow chart depicting an example method 200 of displaying video frames to a viewer via a HMD (e.g., HMD 110). The method 200 may be performed by software constructs described in connection with FIG. 1, which reside in memory 126 of the VR computer 120 and are run by the set of processing units 124.

At 202, the rendering manager 150 receives eye saccade indication data (e.g., saccade indication data 142) indicating that the viewer is undergoing an eye saccade.

At 204, the rendering manager 150 performs, in response to a receipt of the eye saccade indication data, an adaptive rendering operation during the eye saccade to produce a transition between a stereo rendering and a non-stereo rendering of an object for a first portion of the plurality of pixels and a maintenance of the stereo rendering of the object for a second portion of the plurality of pixels.

Figure 3:
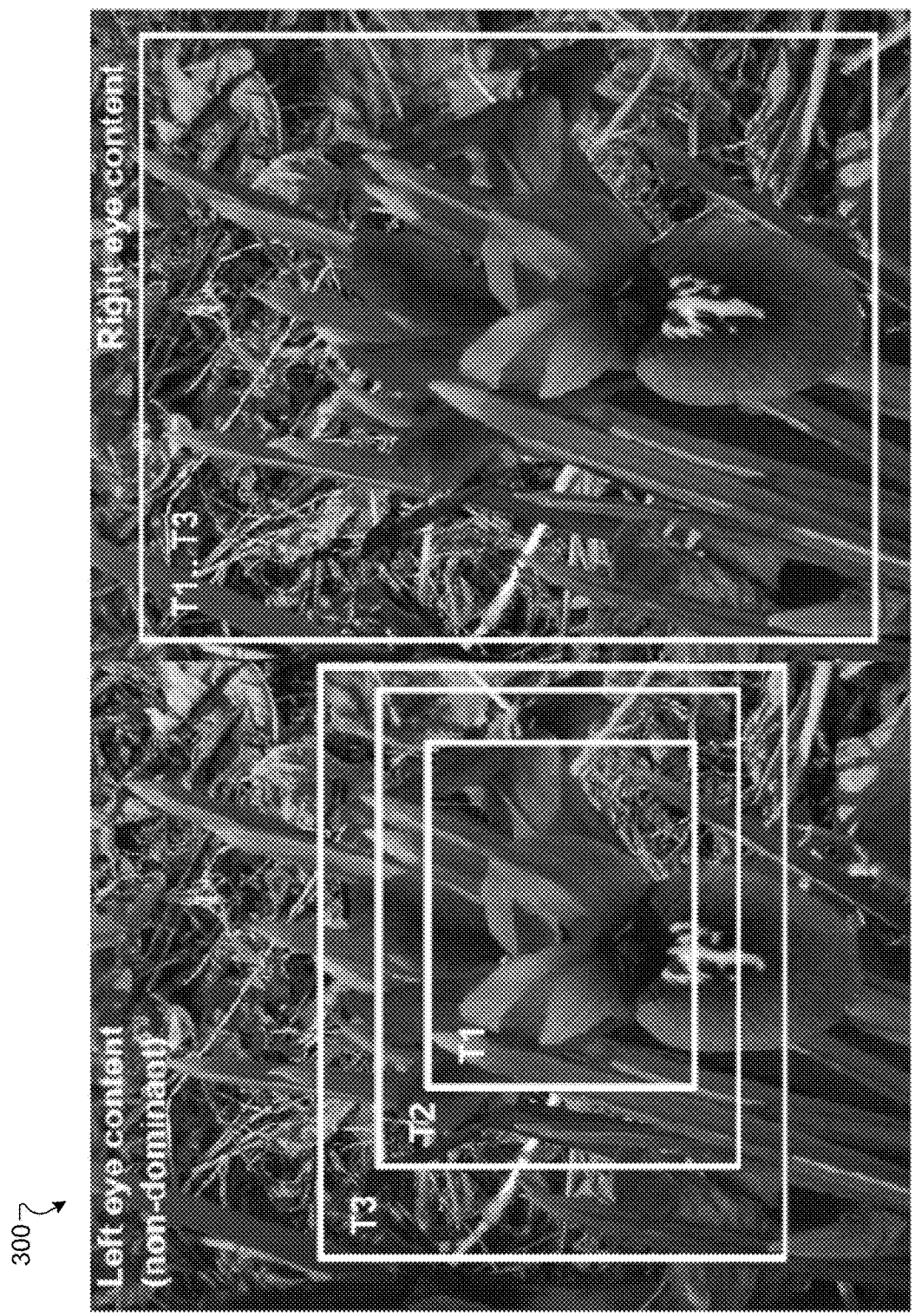
FIG. 3 is a diagram illustrating an example transition to non-stereo rendering for a non-dominant eye according to the improved techniques described herein.

FIG. 3 is a diagram illustrating an example rendering of an image 300 in the HMD 110 for the case of the non-dominant eye of a user being the left eye. In this example, the image as seen by the left eye is divided into several regions. In this case, each smaller region is included within the larger regions, although this is by no means a requirement.

The rendering manager 150 (FIG. 1) in this case performs, as part of the adaptive rendering operation, a transition of the image rendering within the region labeled "T1" over a first time interval T1 during eye saccade. The rendering manager 150 then performs a transition of the image rendering within the region labeled "T2" over a second time interval T2 after the first time interval T1 during eye saccade. The rendering manager 150 then performs a transition of the image rendering within the region labeled "T3" over a third time interval T3 after the second time interval T2 during eye saccade.

In some implementations, the rendering manager 150 may then perform, as part of the adaptive rendering operation, a transition from non-stereo rendering back to stereo rendering for the left eye. In some implementations, the transition from non-stereo rendering back to stereo rendering may be performed after the time interval T3. In some implementations, the transition from non-stereo rendering back to stereo rendering may occur sequentially. For example, the transition from non-stereo rendering back to stereo rendering may occur in the region labeled "T1" while the rendering manager 150 is performing the transition of the image rendering within the region labeled "T2" over the second time interval T2, and so on.

A benefit of performing such transitions over different sets of pixels at different times is that a perception of flicker by the viewer 108 (FIG. 1) is reduced or eliminated.

Figure 4:
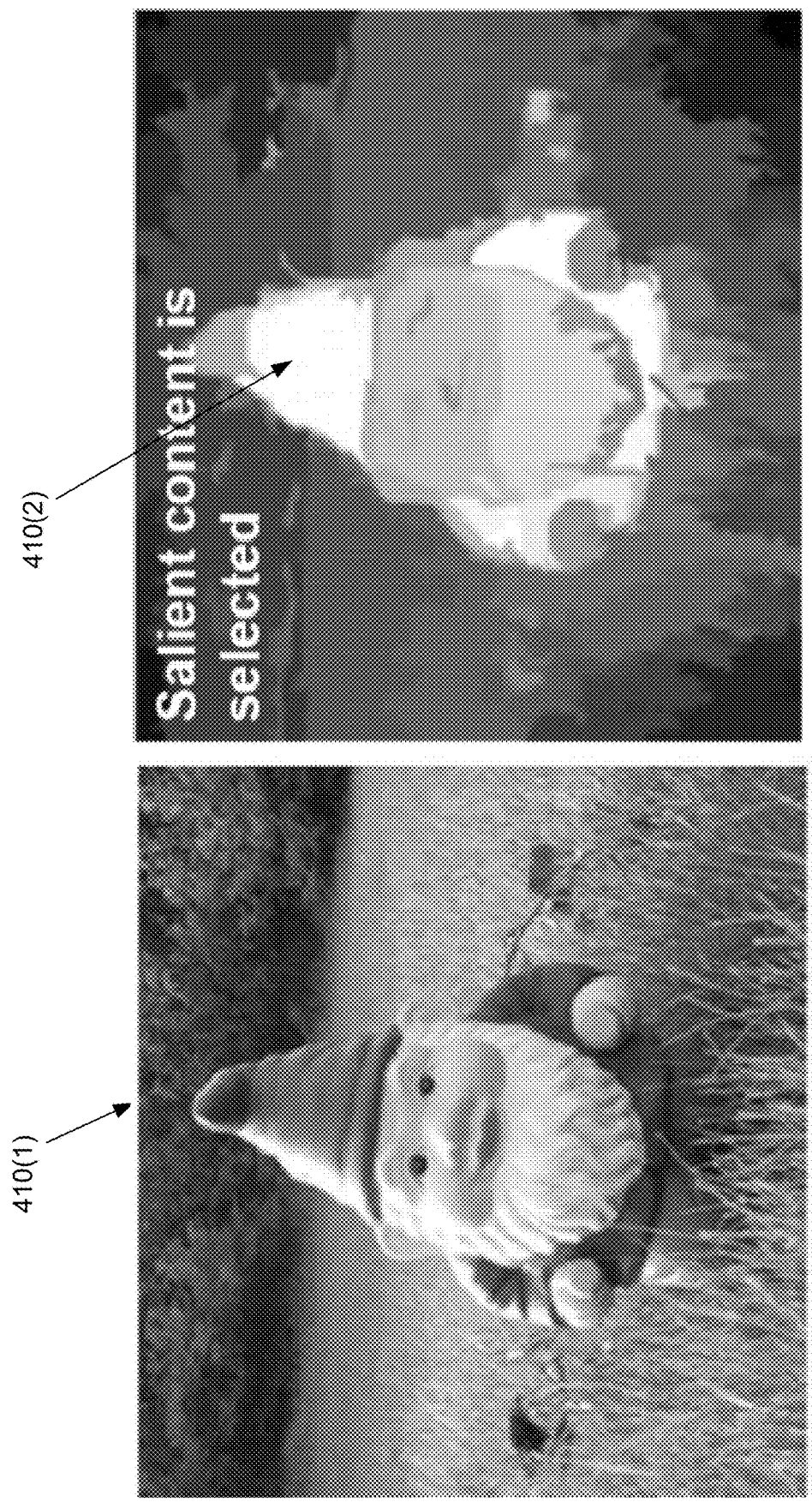
FIG. 4 is a diagram illustrating example salient content in an image.

FIG. 4 is a diagram illustrating example salient content 410(2) in an image 410(1). The salient content 410(2), in some implementations, represents an image of an object at which a viewer (e.g., viewer 108) has been looking. In this case, the eye tracking manager 140 may then identify such an image of an object within a video frame by determining the direction in which an eye (or both eyes) of the viewer is looking, as well as a vergence at which the eye is focused.

As shown in FIG. 4, the salient content 410(2) is identified as bright (e.g., white) pixels and non-salient content is identified as dark pixels, although this is by no means a requirement. The rendering manager 150 may then maintain the stereo transition for the salient content, while performing a transition between stereo and non-stereo rendering for the non-salient content. If there are several regions of an image that include salient content, then each such region may be transitioned at different times.

Figure 5:
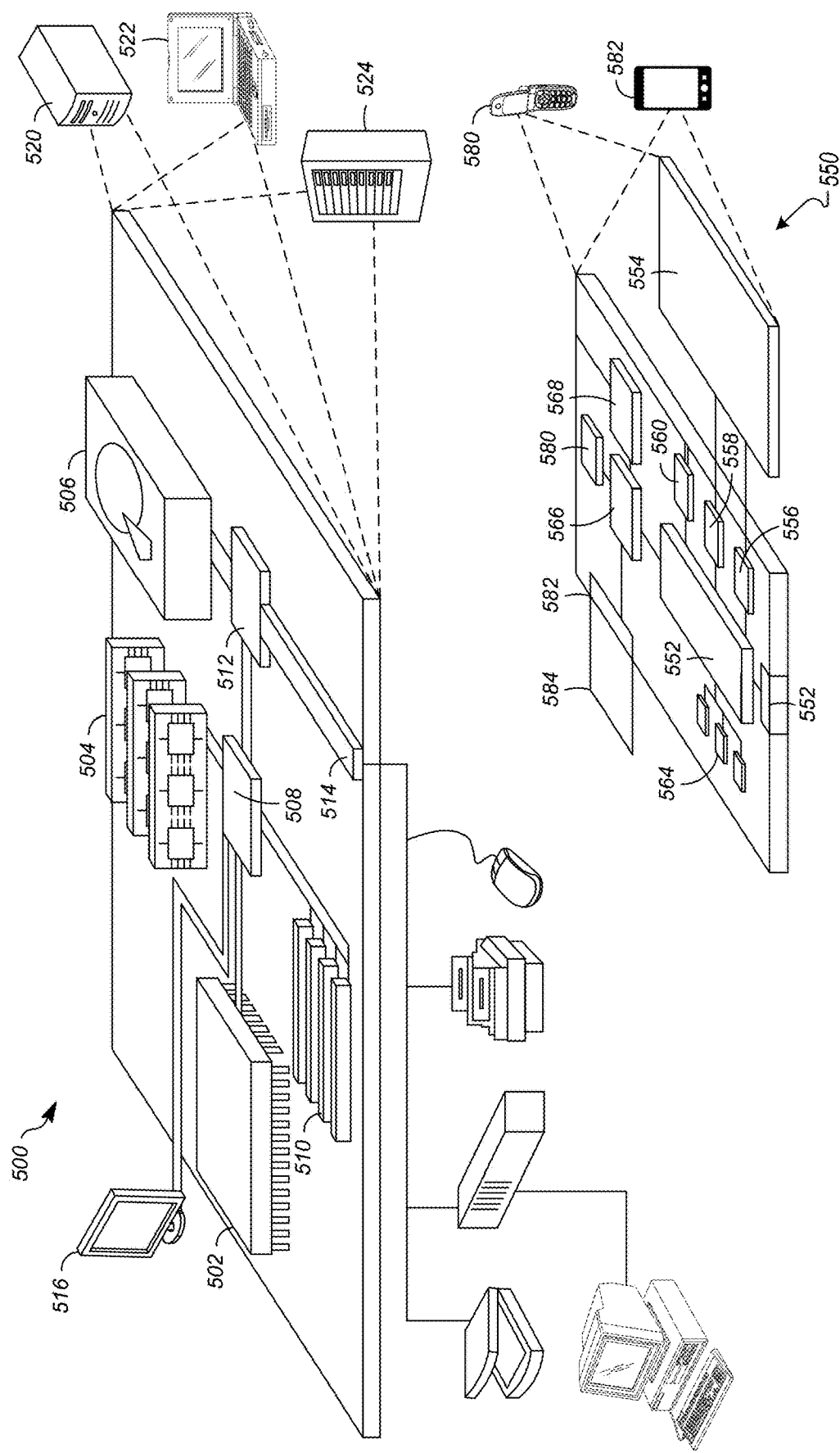
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 600. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Figure 6:
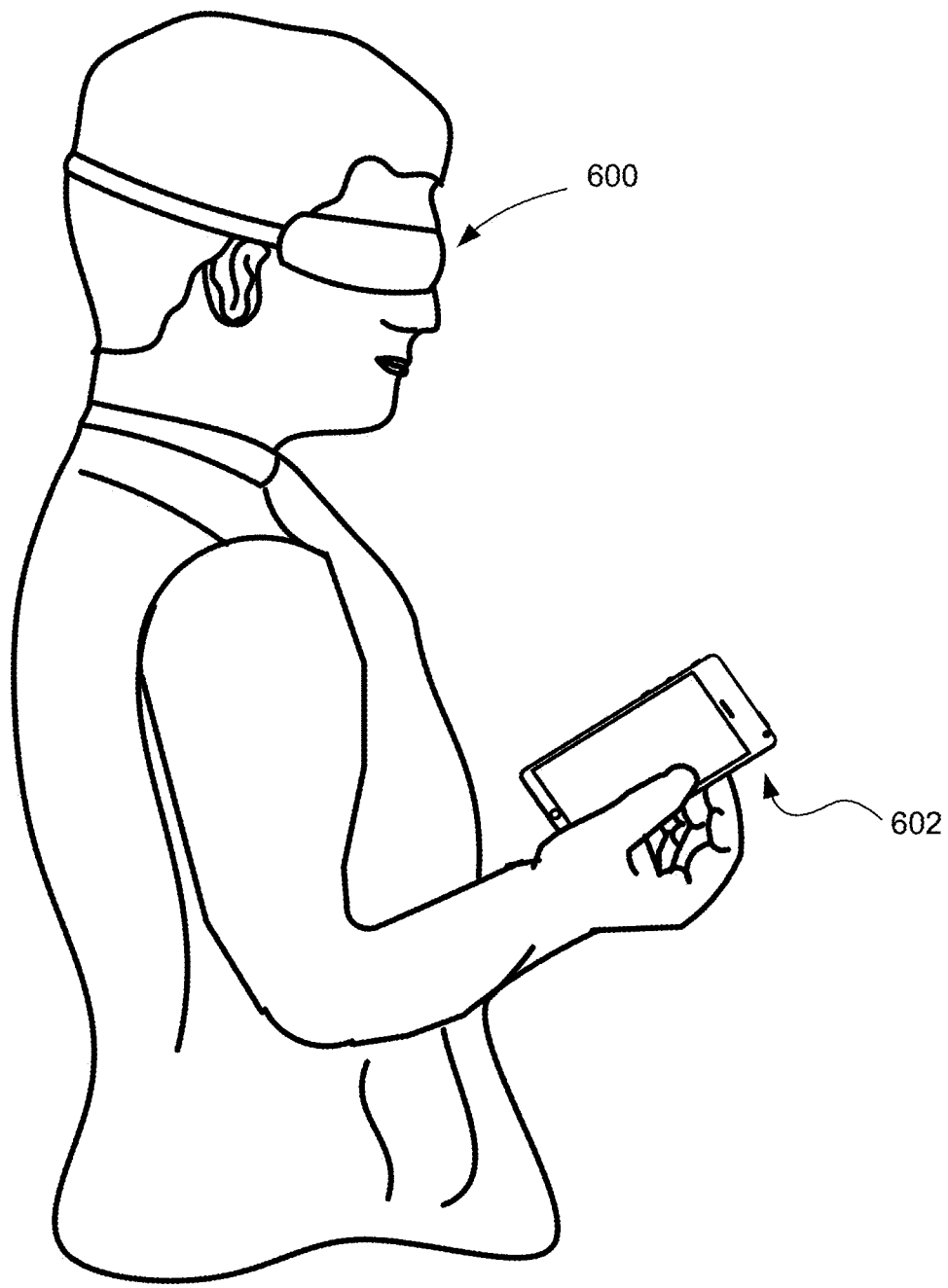
FIG. 6 is a diagram depicting an example VR head-mounted display (HMD).

FIG. 6 illustrates an example implementation of a head-mounted display. In FIG. 6, a user wearing an HMD 600 is holding a portable handheld electronic device 602. The handheld electronic device 602 may be, for example, a smartphone, a controller, a joystick, or another portable handheld electronic device(s) that may be paired with, and communicate with, the HMD 600 for interaction in the immersive virtual environment generated by the HMD 600. The handheld electronic device 602 may be operably coupled with, or paired with the HMD 600 via, for example, a wired connection, or a wireless connection such as, for example, a WiFi or Bluetooth connection. This pairing, or operable coupling, of the handheld electronic device 602 and the HMD 600 may provide for communication between the handheld electronic device 602 and the HMD 600 and the exchange of data between the handheld electronic device 602 and the HMD 700. This may allow the handheld electronic device 602 to function as a controller in communication with the HMD 600 for interacting in the immersive virtual environment generated by the HMD 700. That is, a manipulation of the handheld electronic device 702, such as, for example, a beam or ray emitted by the handheld electronic device 602 and directed to a virtual object or feature for selection, and/or an input received on a touch surface of the handheld electronic device 702, and/or a movement of the handheld electronic device 702, may be translated into a corresponding selection, or movement, or other type of interaction, in the immersive virtual environment generated by the HMD 700. For example, the HMD 700, together with the handheld electronic device 702, may generate a virtual environment as described above, and the handheld electronic device 602 may be manipulated to effect a change in scale, or perspective, of the user relative to the virtual features in the virtual environment as described above.

FIGS. 7A and 7B are perspective views of an example HMD, such as, for example, the HMD 600 worn by the user in FIG. 6, and FIG. 7C illustrates an example handheld electronic device, such as, for example, the handheld electronic device 602 shown in FIG. 6.

The handheld electronic device 702 may include a housing 703 in which internal components of the device 702 are received, and a user interface 704 on an outside of the housing 703, accessible to the user. The user interface 704 may include a touch sensitive surface 706 configured to receive user touch inputs. The user interface 704 may also include other components for manipulation by the user such as, for example, actuation buttons, knobs, joysticks and the like. In some implementations, at least a portion of the user interface 704 may be configured as a touchscreen, with that portion of the user interface 704 being configured to display user interface items to the user, and also to receive touch inputs from the user on the touch sensitive surface 706. The handheld electronic device 702 may also include a light source 708 configured to selectively emit light, for example, a beam or ray, through a port in the housing 703, for example, in response to a user input received at the user interface 704.

The HMD 700 may include a housing 710 coupled to a frame 720, with an audio output device 730 including, for example, speakers mounted in headphones, also be coupled to the frame 720. In FIG. 7B, a front portion 710a of the housing 710 is rotated away from a base portion 710b of the housing 710 so that some of the components received in the housing 710 are visible. A display 740 may be mounted on an interior facing side of the front portion 710a of the housing 710. Lenses 750 may be mounted in the housing 710, between the user's eyes and the display 740 when the front portion 710a is in the closed position against the base portion 710b of the housing 710. In some implementations, the HMD 700 may include a sensing system 760 including various sensors and a control system 770 including a processor 790 and various control system devices to facilitate operation of the HMD 700.

In some implementations, the HMD 700 may include a camera 780 to capture still and moving images. The images captured by the camera 780 may be used to help track a physical position of the user and/or the handheld electronic device 702 in the real world, or physical environment relative to the virtual environment, and/or may be displayed to the user on the display 740 in a pass through mode, allowing the user to temporarily leave the virtual environment and return to the physical environment without removing the HMD 700 or otherwise changing the configuration of the HMD 700 to move the housing 710 out of the line of sight of the user.

In some implementations, the HMD 700 may include a gaze tracking device 765 to detect and track an eye gaze of the user. The gaze tracking device 765 may include, for example, an image sensor 765A, or multiple image sensors 765A, to capture images of the user's eyes, for example, a particular portion of the user's eyes, such as, for example, the pupil, to detect, and track direction and movement of, the user's gaze. In some implementations, the HMD 700 may be configured so that the detected gaze is processed as a user input to be translated into a corresponding interaction in the immersive virtual experience.

For 360 degree HMD video/image streaming, streaming the captured content can be quite computationally expensive. As an example, streaming content (e.g., 360 degree content) with visual acuity of 20:30 may require streaming around 180 Gb of data at 24 frames per second. Even with robust compression techniques, streaming and even decoding such high resolution content at a desired frame rate may not be feasible.

Some implementations can utilize, for example, pose and/or location and can divide the 360 degree content into multiple regions. The algorithms can be executed by compressing a portion of the content that has lower likelihood of being seen at much higher compression ratio.

Figure 12:
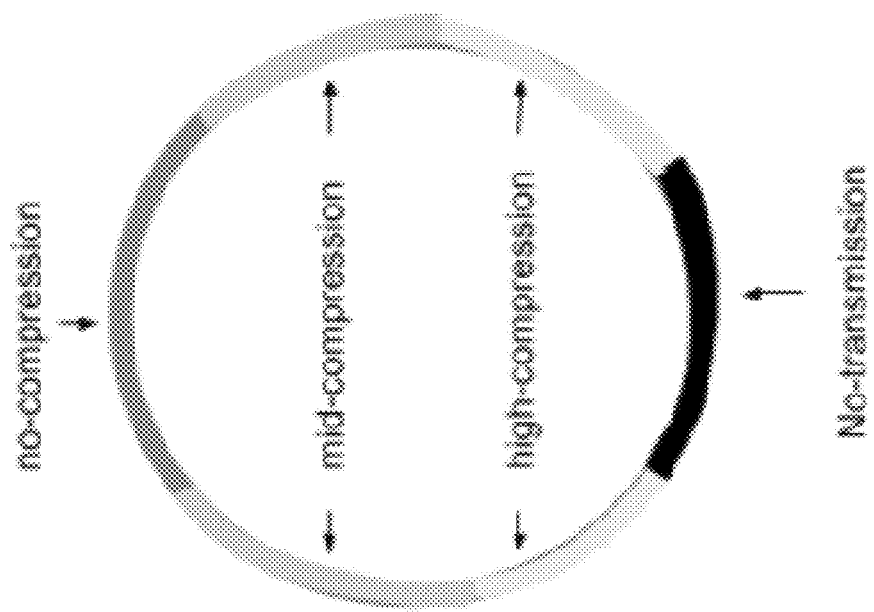
FIG. 12 is a diagram illustrating an example distribution of compression over a 360 degree field of view (FOV).
Figure 12:
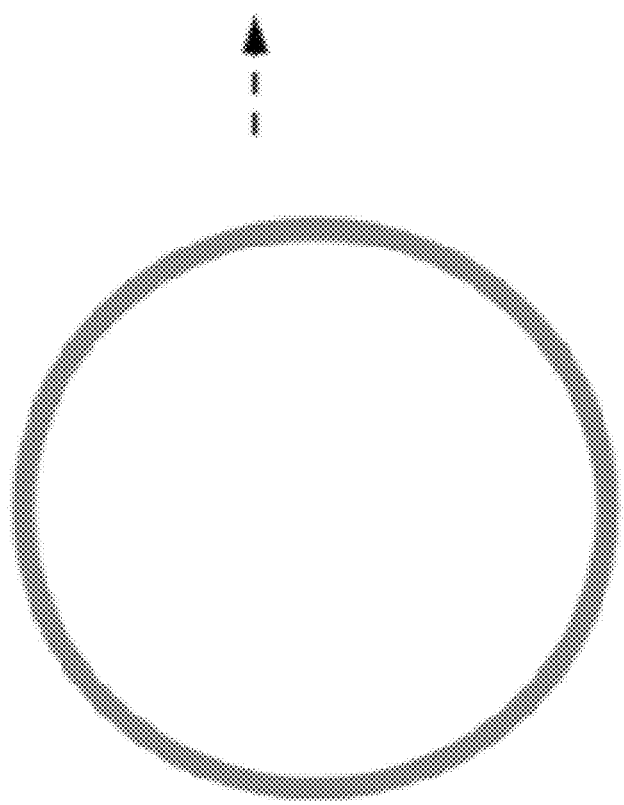

In some implementations, the 360 content is divided into multiple regions, each of the multiple regions can be compressed or downsampled at different rate as shown in, for example, FIG. 12.

However, on the boundary between regions these methods may have significant transition artifacts. The spatial artifact can cause additional motion artifact, similar to flicker, when there is a head motion.

The compression techniques described herein execute additional processing in addition to the algorithms described above by enabling a smoothly varying compression ratio. Advantages can include at least any combination of the following:
1. Little or no visual artifact at boundary region thus enabling better foveation during streaming.
2. Tunnel vision artifact is reduced, when on existing approaches severe anti-aliasing is used to reduce temporal artifacts.
3. Improved (e.g., better) compression ratios.
4. The concepts describe herein take advantage of existing compression blocks, and thus, are able to use existing hardware features with specific bit manipulation.

In the context of static image compression, some methods of foveation are based on a downsampling of the original image data towards the periphery. There may be just two levels of resolution—high resolution surrounding the fixation point and low resolution for the periphery—or multiple levels of resolution such as in a Gaussian pyramid or log-polar sampling. These implementations can be based on replacing the downsampling with a compression strategy such as, for example, Joint Photographic Experts Group (JPEG) compression or another compression algorithm or format. Regions of different resolution are replaced by regions of different attributes (e.g., quality (e.g., JPEG quality)). For example, in some implementations, multiple different resolution images can be used (e.g., 4 different resolutions). Although discussed in terms of quality as related to JPEG, in some implementations, other attributes can be used such as compression ratios.

Rather than downsampling and then expanding as can be done, the implementations described herein use multiple different (e.g., 4 different) quality levels. For example, the periphery is compressed using the lowest quality and each successive region (e.g., each successive concentric region moving out toward the periphery) can be compressed with increasing quality up to highest quality in the foveal region.

Since JPEG and Moving Picture Experts Group (MPEG) can be based on a Discrete Cosine Transform (DCT) of, for example, 8×8 or 16×16 blocks, in some implementations, varying-quality compression can be achieved by manipulating the peripheral blocks as they are independent from the central blocks. In addition to reducing transition artifact, another advantage of the implementations described herein over downsampling-upsampling is that these implementations specifically handle differential compression of the color information, compressing the blues more than the reds, and/or so forth.

Figure 8:
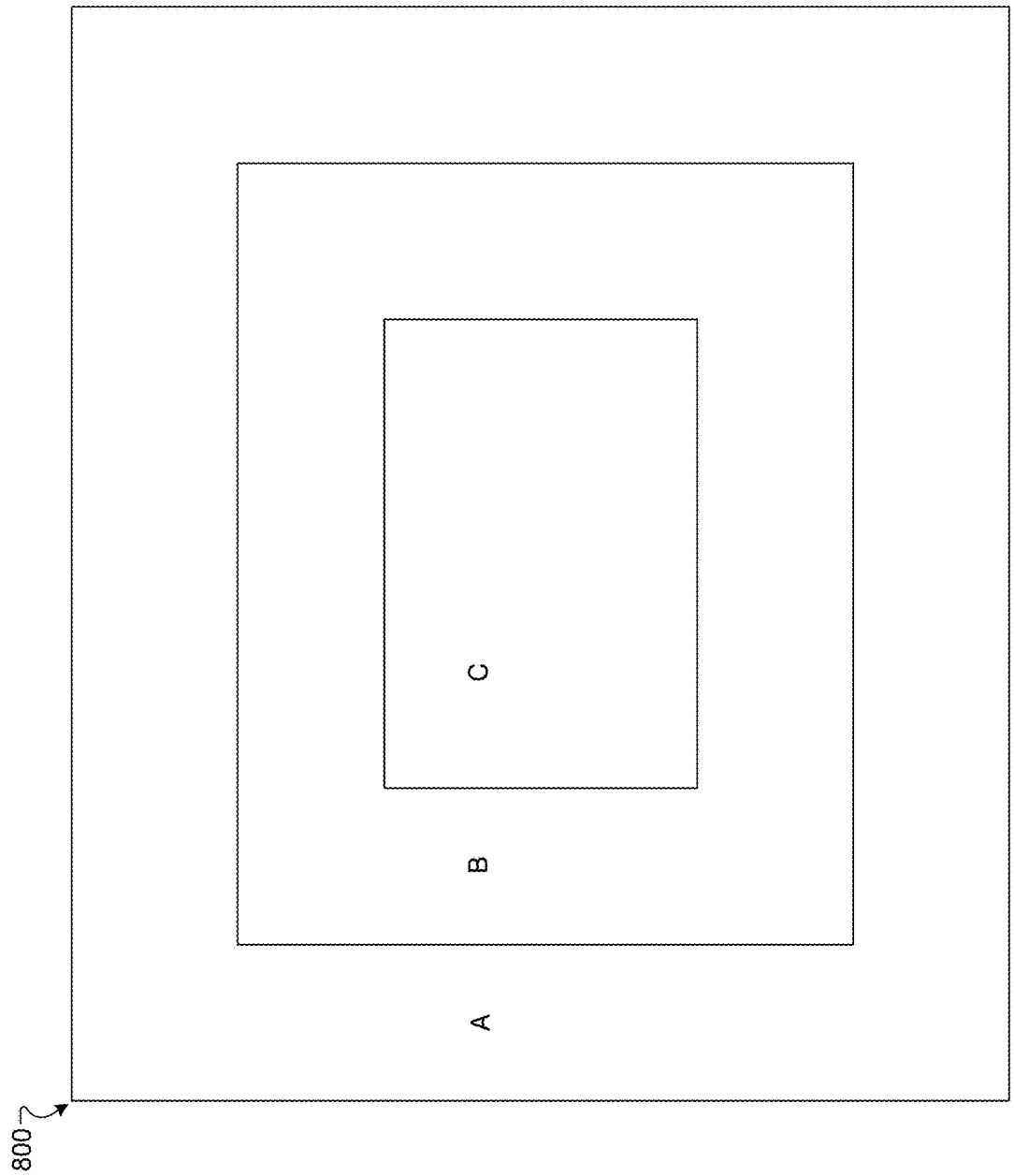
FIG. 8 is a diagram illustrating examples of different regions that are handled using different quality levels.

FIG. 8 illustrates different regions that are handled using different quality levels. As shown in FIG. 8, an image 800 includes regions A (e.g., foveal region) through C (e.g., outer peripheral region), which can each be processed (e.g., compressed) using different quality levels. Region A can have the highest quality and region C can have the lowest quality. Region B can have a quality level between region A and region C.

Figure 9:
FIG. 9 is a diagram illustrating an example original input JPEG image.

FIG. 9 illustrates an example original (e.g., initial, starting) input JPEG image. In this implementation, the original JPEG image has the following characteristics: 4256×2832, 7.5 Mb original camera jpg, 12 M pixel.

FIGS. 10A through 10D represent different quality versions of the original image compressed at different compression ratios by specifying different JPEG quality levels. FIGS. 10A through 10D are quality levels 5, 11, 20, and 50 respectively.

Figure 10A:
FIGS. 10A-10D are diagrams illustrating example quality versions of the original image compressed at different compression ratios by specifying different JPEG quality levels.

As shown in FIG. 10A, the image version has a relatively dramatic change in the colors and the very coarse sampling. This image version shown in FIG. 10A is 291 Kb (i.e., 3.9% of original 7.5 Mb JPEG from the camera and only 2.4% of the original 12 Mb (12 M pixel non-demosaiced) RAW data.

Figure 10B:
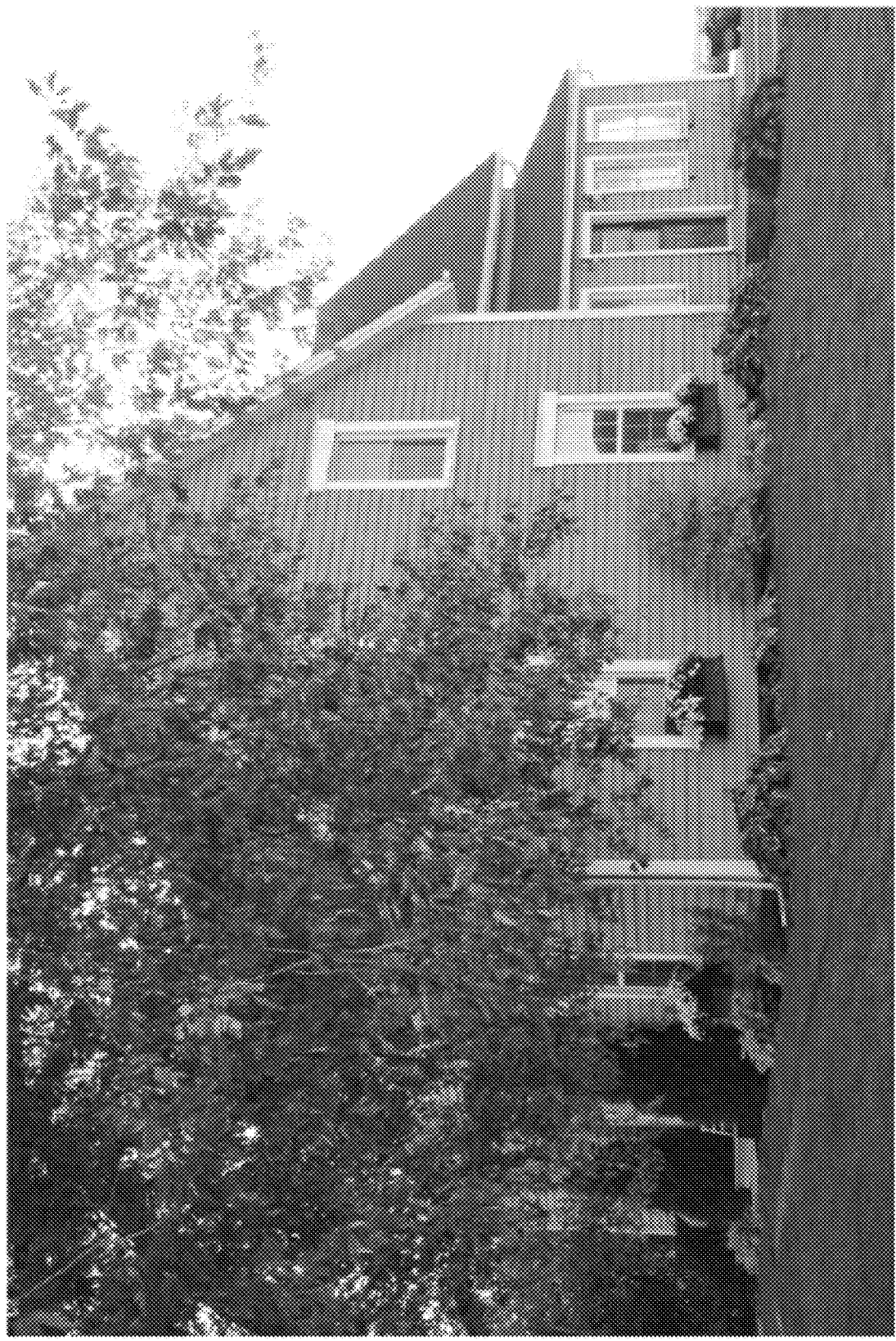
Figure 10C:

In FIG. 10B the image version has a quality level of 11, which is 438 Kb. The version of the image in FIG. 10C has a quality level of 20 and is 628 Kb. The version of the image in FIG. 10C has a quality level of 50 and is 1.1 Mb.

Figure 10D:
Figure 11:
FIG. 11 is a diagram illustrating an example composite image that includes portions of each of the image versions from FIGS. 10A through 10D.

FIG. 11 illustrates a composite image that includes portions of each of the image versions from FIGS. 10A through 10D. A portion of the image version in FIG. 10A is around the outer periphery and a portion of the image version in FIG. 10D is in the center region. A portion of the image version in FIG. 10C surrounds the portion of the image version in FIG. 10D and a portion of the image version in FIG. 10B surrounds the portion of the image version in FIG. 10C. Each of the portions of the image versions, in this implementation, are rectangular (e.g., in some implementations, other shapes can be implemented).

The above portions of the image versions from FIGS. 10A through 10D define a varying-quality foveated JPEG image in FIG. 11. In FIG. 11, the outline of the largest patch (quality level 11 (from FIG. 10B) on top of quality level 5 (from FIG. 10A)) along the right hand side. When fixating a view on the red dot (with the image zoomed to full screen size) the artifacts may not be perceptible to a user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by controlling circuitry of a processor configured to display video content to a viewer over a plurality of pixels of a display, eye saccade indication data indicating that the viewer is undergoing an eye saccade; and
   in response to receiving the eye saccade indication data, performing, by the controlling circuitry, an adaptive rendering operation during the eye saccade to produce a transition between a stereo rendering and a non-stereo rendering of an object for a first portion of the plurality of pixels and a maintenance of the stereo rendering of the object for a second portion of the plurality of pixels.

2. The method of claim 1, wherein the display is a head-mounted display (HMD), and
   wherein the first portion of pixels is associated with a field of view (FOV) of a first eye of the viewer and the second portion of pixels is associated with a FOV of a second eye of the viewer.

3. The method of claim 2, wherein the first eye is a non-dominant eye and the second eye is a dominant eye.

4. The method of claim 1, wherein the adaptive rendering operation is a first adaptive rendering operation, and
   wherein the method further comprises:
      after performing the first adaptive rendering operation, performing a second adaptive rendering operation to produce a transition between the non-stereo rendering of the object and the stereo rendering of the object for the first portion of the plurality of pixels.

5. The method of claim 1, wherein performing the adaptive rendering operation during the eye saccade includes:
   producing a transition to a non-stereo rendering of a first set of the first portion of the plurality of pixels during a first time and a transition to a non-stereo rendering of a second set of the first portion of the plurality of pixels during a second time after the first time.

6. The method of claim 5, wherein the second set of the first portion of the plurality of pixels includes the first set of the first portion of the plurality of pixels.

7. The method of claim 1, wherein the video content displayed to the viewer over the first portion of the plurality of pixels of the display includes first salient content and second salient content, and
   wherein performing the adaptive rendering operation during the eye saccade includes:
      identifying first pixels associated with the first salient content and second pixels associated with the second salient content; and
      producing a transition to a non-stereo rendering of the first pixels during a first time and a transition to a non-stereo rendering of the second pixels during a second time after the first time.

8. The method as in claim 1, wherein the adaptive rendering operation performed during the eye saccade is configured to reduce accommodation conflict in the viewer.

9. A computer program product comprising a non-transitory storage medium, the computer program product including code that, when executed by processing circuitry of a user device configured to display video content to a viewer over a plurality of pixels of a display, causes the processing circuitry to perform a method, the method comprising:
   receiving eye saccade indication data indicating that the viewer is undergoing an eye saccade; and
   in response to receiving the eye saccade indication data, performing an adaptive rendering operation during the eye saccade to produce a transition between a stereo rendering and a non-stereo rendering of an object for a first portion of the plurality of pixels and a maintenance of the stereo rendering of the object for a second portion of the plurality of pixels.

10. The computer program product of claim 9, wherein the display is a head-mounted display (HMD), and
    wherein the first portion of pixels is associated with a field of view (FOV) of a first eye of the viewer and the second portion of pixels is associated with a FOV of a second eye of the viewer.

11. The computer program product of claim 10, wherein the first eye is a non-dominant eye and the second eye is a dominant eye.

12. The computer program product of claim 9, wherein the adaptive rendering operation is a first adaptive rendering operation, and
wherein the method further comprises:
after performing the first adaptive rendering operation, performing a second adaptive rendering operation to produce a transition between the non-stereo rendering of the object and the stereo rendering of the object for the first portion of the plurality of pixels.

13. The computer program product of claim 9, wherein performing the adaptive rendering operation during the eye saccade includes:
producing a transition to a non-stereo rendering of a first set of the first portion of the plurality of pixels during a first time and a transition to a non-stereo rendering of a second set of the first portion of the plurality of pixels during a second time after the first time.

14. The computer program product of claim 13, wherein the second set of the first portion of the plurality of pixels includes the first set of the first portion of the plurality of pixels.

15. The computer program product of claim 9, wherein the video content displayed to the viewer over the first portion of the plurality of pixels of the display includes first salient content and second salient content, and
wherein performing the adaptive rendering operation during the eye saccade includes:
identifying first pixels associated with the first salient content and second pixels associated with the second salient content; and
producing a transition to a non-stereo rendering of the first pixels during a first time and a transition to a non-stereo rendering of the second pixels during a second time after the first time.

16. An electronic apparatus configured to display video content to a viewer over a plurality of pixels of a display, the electronic apparatus comprising:
memory; and
controlling circuitry coupled to the memory, the controlling circuitry being configured to:
receive eye saccade indication data indicating that the viewer is undergoing an eye saccade; and
in response to a receipt of the eye saccade indication data, perform an adaptive rendering operation during the eye saccade to produce a transition between a stereo rendering and a non-stereo rendering of an object for a first portion of the plurality of pixels and a maintenance of the stereo rendering of the object for a second portion of the plurality of pixels.

17. The electronic apparatus product of claim 16, wherein the display is a head-mounted display (HMD), and
wherein the first portion of pixels is associated with a field of view (FOV) of a first eye of the viewer and the second portion of pixels is associated with a FOV of a second eye of the viewer.

18. The electronic apparatus of claim 17, wherein the first eye is a non-dominant eye and the second eye is a dominant eye.

19. The electronic apparatus of claim 16, wherein the adaptive rendering operation is a first adaptive rendering operation, and
wherein the controlling circuitry is further configured to:
after performing the first adaptive rendering operation, perform a second adaptive rendering operation to produce a transition between the non-stereo rendering of the object and the stereo rendering of the object for the first portion of the plurality of pixels.

20. The electronic apparatus of claim 16, wherein the controlling circuitry configured to perform the adaptive rendering operation during the eye saccade is further configured to:
produce a transition to a non-stereo rendering of a first set of the first portion of the plurality of pixels during a first time and a transition to a non-stereo rendering of a second set of the first portion of the plurality of pixels during a second time after the first time.

21. The electronic apparatus of claim 16, wherein the video content displayed to the viewer over the first portion of the plurality of pixels of the display includes first salient content and second salient content, and
wherein the controlling circuitry configured to perform the adaptive rendering operation during the eye saccade is further configured to:
identify first pixels associated with the first salient content and second pixels associated with the second salient content; and
produce a transition to a non-stereo rendering of the first pixels during a first time and a transition to a non-stereo rendering of the second pixels during a second time after the first time.

\* \* \* \* \*